(12) United States Patent
Sugano

(10) Patent No.: US 12,351,203 B2
(45) Date of Patent: Jul. 8, 2025

(54) DEVICE AND METHOD FOR NOTIFICATION

(71) Applicant: TOYOTA JIDOSHA KABUSHIKI KAISHA, Toyota (JP)

(72) Inventor: Tatsuya Sugano, Shizuoka-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 1 day.

(21) Appl. No.: 18/375,577

(22) Filed: Oct. 2, 2023

(65) Prior Publication Data

US 2024/0132092 A1   Apr. 25, 2024
US 2024/0227837 A9   Jul. 11, 2024

(30) Foreign Application Priority Data

Oct. 19, 2022   (JP) ................. 2022-167800

(51) Int. Cl.
   *G08G 1/14*   (2006.01)
   *B60W 30/06*   (2006.01)
   *B60W 50/14*   (2020.01)

(52) U.S. Cl.
   CPC ............ *B60W 50/14* (2013.01); *B60W 30/06* (2013.01); *B60W 2050/146* (2013.01); *B60W 2556/45* (2020.02)

(58) Field of Classification Search
   CPC ............... B60W 50/14; B60W 30/06; B60W 2050/146; B60W 2556/45; G08G 1/096725; G08G 1/0968; G08G 1/143

USPC ................ 340/932.2, 933, 937, 988, 990
See application file for complete search history.

(56) References Cited

U.S. PATENT DOCUMENTS

| 10,795,359 | B2* | 10/2020 | Choi ................ G01C 21/3685 |
| 2018/0345954 | A1* | 12/2018 | Gougeon ............ G05D 1/0088 |
| 2020/0130676 | A1* | 4/2020 | Smid ................. B60W 30/06 |
| 2020/0258183 | A1 | 8/2020 | Okamura |
| 2020/0276982 | A1 | 9/2020 | Shoda et al. |
| 2021/0316718 | A1 | 10/2021 | Sugano |

FOREIGN PATENT DOCUMENTS

| JP | 2020-129780 A | 8/2020 |
| JP | 2020-140516 A | 9/2020 |
| JP | 2021-166018 A | 10/2021 |

\* cited by examiner

*Primary Examiner* — Anh V La
(74) *Attorney, Agent, or Firm* — Dinsmore & Shohl LLP

(57) ABSTRACT

A notification device notifies a driver of a vehicle to be parked in one of a plurality of parking spaces in a parking area including a control device that transmits control information for parking travel control of the vehicle heading for the assigned parking space to the vehicle via a communication network that the parking travel control is not executable, via an output device mounted on the vehicle, in the case where it is determined that the vehicle has arrived within the predetermined distance of the parking area, the travel controller is incapable of executing the parking travel control, and the driver is in the vehicle.

4 Claims, 4 Drawing Sheets

DEVICE AND METHOD FOR NOTIFICATION

CROSS-REFERENCE TO RELATED APPLICATION

This application claims priority to Japanese Patent Application No. 2022-167800 filed on Oct. 19, 2022, the entire contents of which are herein incorporated by reference.

FIELD

The present disclosure relates to a device and a method for notifying information to a driver of a vehicle.

BACKGROUND

A known automated valet parking system executes automated driving control of a vehicle between a predetermined place and a parking space in a parking area.

Japanese Unexamined Patent Publication No. 2021-166018 describes an automated valet parking system that notifies the occurrence of an anomaly to a user of a vehicle if a braking distance at execution of braking control for stopping the vehicle in a parking space is outside a tolerable range. The automated valet parking system can sense the completion of parking of the vehicle, using a sensor installed in the parking area.

SUMMARY

In a parking area designed for automated valet parking, control information including designation of a predetermined assigned parking space is transmitted via a communication network to a vehicle to be parked. Using such control information, the vehicle can travel to the assigned parking space under automated driving by a travel controller.

The travel controller may fail to control travel of the vehicle to the assigned parking space appropriately because of a problem such as an insufficient bandwidth of the communication network used for transmission of the control information to the vehicle, a problem with an environmental sensor for obtaining environmental data indicating conditions around the vehicle, or a malfunction of the travel controller. In this case, the vehicle makes notification to someone who can drive the vehicle, such as a driver of the vehicle, and requests an action. If the problem is found after the driver has got out of the vehicle, the driver needs to get in again, which may be annoying.

It is an object of the present disclosure to provide a notification device that can appropriately notify a driver of the state of a vehicle to be parked in a parking area designed for automated valet parking.

The following is a summary of the present disclosure.

(1) A notification device comprising a processor configured to:
   determine whether a vehicle has arrived within a predetermined distance of a parking area including a plurality of parking spaces and a control device that transmits control information to the vehicle via a communication network, wherein the vehicle is to be parked in one of the parking spaces, and the control information includes designation of a parking space assigned to the vehicle among the parking spaces and is used for parking travel control of the vehicle heading for the assigned parking space;
   determine whether a travel controller mounted on the vehicle is capable of executing the parking travel control;
   determine whether a driver is in the vehicle; and
   notify a driver of the vehicle that the parking travel control is not executable, via an output device mounted on the vehicle, in the case where it is determined that the vehicle has arrived within the predetermined distance of the parking area, the travel controller is incapable of executing the parking travel control, and the driver is in the vehicle.

(2) The notification device according to item (1), wherein in the determination of arrival, the processor determines whether the vehicle has arrived within the predetermined distance of a parking area where the vehicle is to be parked among a plurality of parking areas each including a plurality of parking spaces and the control device.

(3) A method for notification having a notification device that notifies information to a driver of a vehicle execute a process comprising:
   determining whether the vehicle has arrived within a predetermined distance of a parking area including a plurality of parking spaces and a control device that transmits control information to the vehicle via a communication network, wherein the vehicle is to be parked in one of the parking spaces, and the control information includes designation of a parking space assigned to the vehicle among the parking spaces and is used for parking travel control of the vehicle heading for the assigned parking space;
   determining whether a travel controller mounted on the vehicle is capable of executing the parking travel control;
   determining whether the driver is in the vehicle; and
   notifying the driver that the parking travel control is not executable, via an output device mounted on the vehicle, in the case where it is determined that the vehicle has arrived within the predetermined distance of the parking area, the travel controller is incapable of executing the parking travel control, and the driver is in the vehicle.

(4) A non-transitory computer-readable medium storing a computer program for notification, the computer program causing a computer mounted on a vehicle to execute a process comprising:
   determining whether the vehicle has arrived within a predetermined distance of a parking area including a plurality of parking spaces and a control device that transmits control information to the vehicle via a communication network, wherein the vehicle is to be parked in one of the parking spaces, and the control information includes designation of a parking space assigned to the vehicle among the parking spaces and is used for parking travel control of the vehicle heading for the assigned parking space;
   determining whether a travel controller mounted on the vehicle is capable of executing the parking travel control;
   determining whether a driver is in the vehicle; and
   notifying the driver that the parking travel control is not executable, via an output device mounted on the vehicle, in the case where it is determined that the vehicle has arrived within the predetermined distance of the parking area, the travel controller is incapable of executing the parking travel control, and the driver is in the vehicle.

The notification device according to the present disclosure can appropriately notify a driver of the state of a vehicle to be parked in a parking area designed for automated valet parking.

DESCRIPTION OF EMBODIMENTS

A notification device that can appropriately notify a driver of the state of a vehicle to be parked in a parking area designed for automated valet parking will now be described with reference to the attached drawings. The notification device determines whether a vehicle has arrived within a predetermined distance of a parking area including a plurality of parking spaces. In the parking area, control information is transmitted via a communication network to the vehicle to be parked in one of the parking spaces. The control information includes designation of a parking space assigned to the vehicle among the parking spaces and is used for parking travel control of the vehicle heading for the assigned parking space. The notification device further determines whether a travel controller mounted on the vehicle is capable of executing the parking travel control, and determines whether a driver is in the vehicle. The notification device notifies a driver of the vehicle that the parking travel control is not executable, via an output device mounted on the vehicle, in the case where it is determined that the vehicle has arrived within the predetermined distance of the parking area, the travel controller is incapable of executing the parking travel control, and the driver is in the vehicle.

Figure 1:
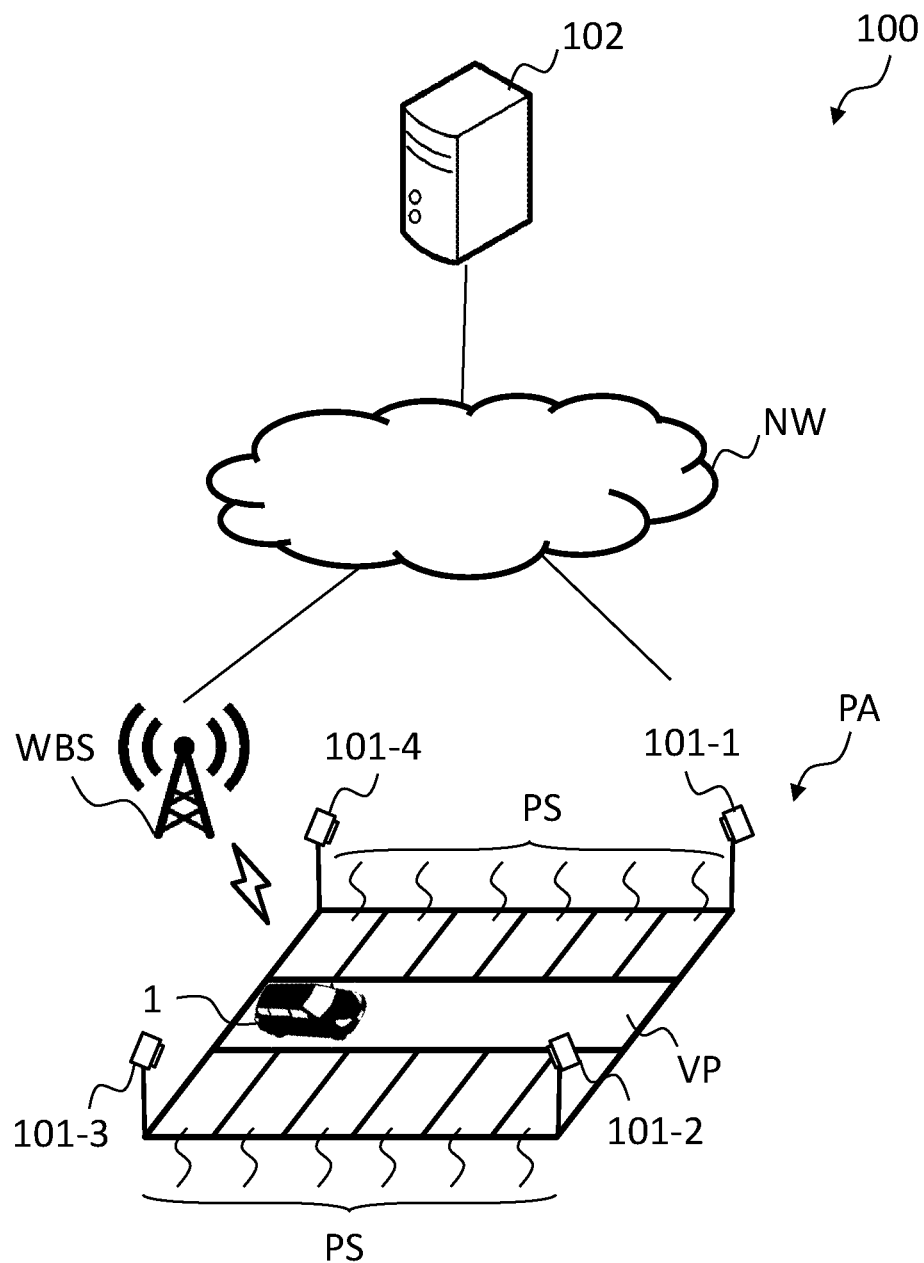
FIG. 1 schematically illustrates the configuration of an automated valet parking system.

FIG. 1 schematically illustrates the configuration of an automated valet parking system. The automated valet parking system 100 includes facility sensors 101-1 to 101-4 (hereafter collectively referred to as "facility sensors 101") installed in a parking area PA, a control device 102, and a vehicle compatible with the automated valet parking system (hereafter a "vehicle 1"). The vehicle 1 includes a travel controller according to the present disclosure, and can travel at least in the parking area PA without a driver's driving operation, based on control information transmitted by the control device 102.

The parking area PA includes a vehicle path VP where the vehicle 1 can travel, and parking spaces PS that border on the vehicle path VP and where the vehicle 1 can be parked. The facility sensors 101 are communicably connected to the control device 102 via a communication network NW. The vehicle 1 accesses a wireless base station WBS, which is connected to the communication network NW, for example, via a gateway (not illustrated), thereby communicably connecting to the control device 102 via the wireless base station WBS and the communication network NW.

The automated valet parking system 100 may include another vehicle compatible with the automated valet parking system, besides the vehicle 1. In the automated valet parking system 100, the communication network NW may be connected with multiple wireless base stations WBS.

Each facility sensor 101 is, for example, a camera including a two-dimensional detector constructed from an array of optoelectronic transducers, such as CCD or C-MOS, having sensitivity to visible light and a focusing optical system that forms an image of a target region on the two-dimensional detector. The facility sensors 101 output facility images representing the parking area PA as facility data, and transmit the facility images to the control device 102 via the communication network NW. In the automated valet parking system 100, the number of facility sensors 101 is not limited to four, and may be less than (e.g., one) or greater than four (e.g., 100). The facility sensors 101 may be connected to the communication network via a relay device (not illustrated). The facility sensors 101 need not be fixed in the parking area PA, and may be mounted, for example, downward on drones flying above the vehicle 1.

The control device 102 is a computer including a communication interface, a memory, and a processor. The control device 102 detects the states of use of the parking spaces PS included in the parking area PA from facility data outputted by the facility sensors 101. Further, the control device 102 receives a request for parking in the parking area PA from a vehicle via the communication network NW. When a parking request is received, the control device 102 assigns one of unoccupied parking spaces PS (e.g., one closest to an entrance or an exit of the parking area PA) to the vehicle, based on a predetermined criterion, and changes the state of use of the parking space PS to "occupied." The control device 102 then transmits control information including designation of the assigned parking space PS to the vehicle via the communication network NW.

The parking request may include designation of a future time at which a parking space PS will be used. When such a parking request is received, the control device 102 assigns a parking space PS unoccupied at the future time to the vehicle, and changes the state of use of the parking space PS from the future time until after a predetermined parking time (e.g., two hours) to "occupied." The parking time may be included in the parking request.

The control information may further include route information indicating a route to be traveled by the vehicle 1 to park in a designated parking space PS. The control device 102 generates route information indicating, for example, a route from an entrance of the parking area PA through the vehicle path VP to an identified one of the parking spaces PS, and transmits the route information as control information.

The control device 102 may transmit object information indicating the position of an object, such as a pedestrian or a vehicle, detected from facility data to the vehicle 1 traveling in the parking area PA as control information indicating conditions around the vehicle 1. When the distance between the vehicle 1 and the object is less than a predetermined distance threshold, the control device 102 may transmit a collision avoidance signal for causing the vehicle 1 to execute collision avoidance control, as control information.

The control device 102 inputs facility data received via the communication network NW into a classifier that has been trained to identify an object region representing an object, thereby detecting an object region representing an object and the type of the represented object from the facility data.

The classifier may be, for example, a convolutional neural network (CNN) including convolution layers connected in series from the input side toward the output side, such as You Only Look Once (YOLO) or Single Shot MultiBox Detector (SSD). A CNN that has been trained using a large number of inputted images representing objects to be detected, such as pedestrians and vehicles, as training data operates as a classifier that detects an object and that outputs an object region representing the object in the image and the type of the object.

Regarding the parking area PA, the memory of the control device 102 stores the positions and sizes of the vehicle path VP and the parking spaces PS, the focal length and the direction of the optical axis of the focusing optical system of each facility sensor 101, and the position where each facility sensor is installed. When an object region corresponding to an object is detected from facility data of multiple facility sensors, the control device 102 estimates the distances from the facility sensors to the object by triangulation and estimates the real-space position of the detected object. When multiple object regions are detected from facility data of each of the facility sensors, the control device 102 may determine, for example, object regions of the same detected type as those corresponding to the same object and estimate the distances to the object and its real-space position. The control device 102 may execute stereo matching on object regions represented in pieces of facility data to identify object regions corresponding to the same object in the pieces of facility data.

Figure 2:
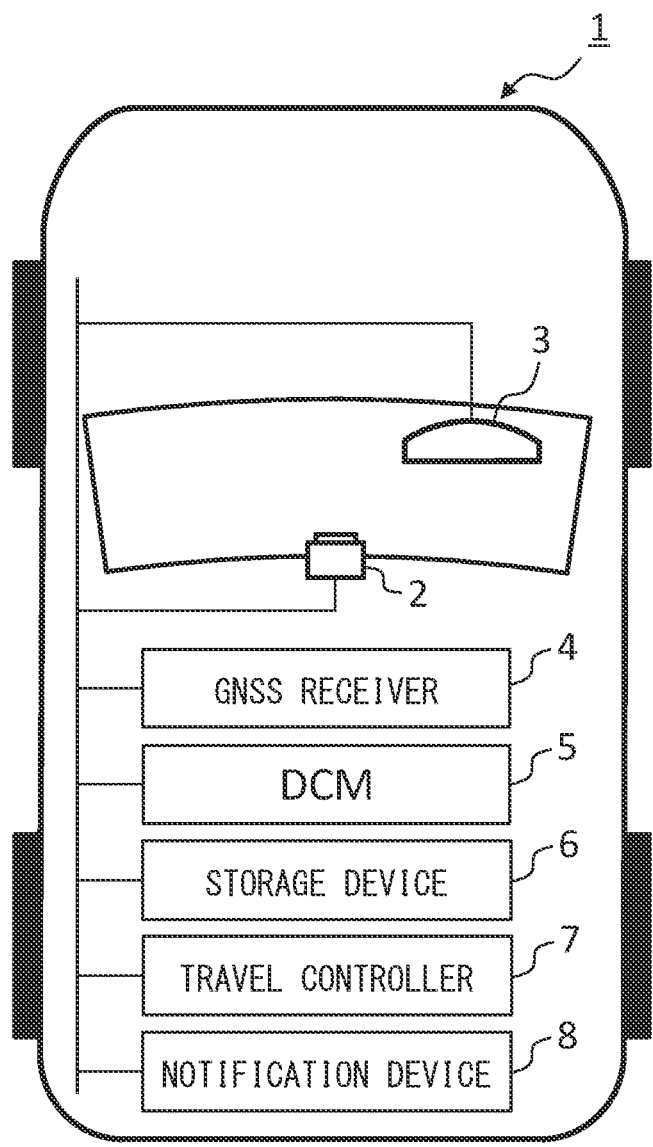
FIG. 2 schematically illustrates the configuration of a vehicle equipped with a notification device.

FIG. 2 schematically illustrates the configuration of the vehicle 1 equipped with a notification device.

The vehicle 1 includes an environmental camera 2, a meter display 3, a global navigation satellite system (GNSS) receiver 4, a data communication module (DCM) 5, a storage device 6, a travel controller 7, and a notification device 8. The environmental camera 2, the meter display 3, the GNSS receiver 4, the data communication module 5, and the storage device 6 are communicably connected to the travel controller 7 and the notification device 8 via an in-vehicle network conforming to a standard such as a controller area network. The travel controller 7 and the notification device 8 are communicably connected via the in-vehicle network.

The environmental camera 2 is an example of the environmental sensor for generating environmental data indicating conditions around the vehicle 1. The environmental camera 2 includes a two-dimensional detector constructed from an array of optoelectronic transducers, such as CCD or C-MOS, having sensitivity to visible light and a focusing optical system that forms an image of a target region on the two-dimensional detector. The environmental camera 2 is disposed, for example, in a front and upper area in the vehicle interior so as to face forward. The environmental camera 2 takes a picture of the surroundings of the vehicle 1 through a windshield every predetermined capturing period (e.g., $1/30$ to $1/10$ seconds), and outputs environmental images representing the surroundings as environmental data. As the environmental sensor, the vehicle 1 may include a sensor other than the environmental camera 2, e.g., a light detection and ranging (LiDAR) sensor that generates a range image, whose pixels each have a value depending on the distance to an object represented in the pixel, based on conditions around the vehicle 1, as environmental data.

The meter display 3, which is an example of the output device, includes, for example, a liquid crystal display. The meter display 3 displays a screen for notifying information to a driver, according to a signal received from the notification device 8 via the in-vehicle network.

The GNSS receiver 4, which is an example of a position determining sensor, receives GNSS signals from GNSS satellites every predetermined period, and determines the position of the vehicle 1, based on the received GNSS signals. The GNSS receiver 4 outputs a positioning signal indicating the result of determination of the position of the vehicle 1 based on the GNSS signals to the notification device 8 via the in-vehicle network every predetermined period. Further, the GNSS receiver 4 detects the current time from time information included in the GNSS signals.

The data communication module 5, which is an example of a vehicle communication unit, is a device to execute a wireless communication process conforming to a predetermined wireless communication standard, such as "4G (4th Generation)" or "5G (5th Generation)." The data communication module 5 passes data included in a radio signal received from the control device 102 to the notification device 8. Further, the data communication module 5 includes data received from the notification device 8 in an uplink radio signal, and transmits the radio signal to the control device 102. The data communication module 5 may be mounted as part of the travel controller 7 or the notification device 8.

The storage device 6, which is an example of a storage unit, includes, for example, a hard disk drive or a nonvolatile semiconductor memory. The storage device 6 stores map data including the position of a parking area designed for automated valet parking.

The travel controller 7 is an electronic control unit (ECU) including a communication interface, a memory, and a processor. The travel controller 7 outputs a control signal to a travel mechanism (not illustrated) of the vehicle 1 via the communication interface so that the vehicle 1 travels toward a parking space designated in control information received from the control device 102 via the data communication module 5. The control information may include a route from the position of the vehicle 1 to the parking space. In addition, for example, the travel controller 7 inputs environmental data outputted from the environmental camera 2 into a classifier that has been trained to detect an object from an image, thereby detecting an object in the vicinity of the vehicle 1, together with a confidence score indicating how likely the object exists, from the environmental data. The travel controller 7 controls travel of the vehicle 1 toward a parking space designated in the control information so that the vehicle 1 passes positions separated from the object detected from the environmental data more than an interval threshold (parking travel control). The travel mechanism includes, for example, a power source for powering the vehicle 1, such as an engine or a motor, and brakes for decelerating the vehicle 1. The travel controller 7 may be capable of a self-test as to whether the parking travel control can be appropriately executed.

The notification device 8 is an ECU including a communication interface 81, a memory 82, and a processor 83. The notification device 8 notifies information to the driver of the vehicle 1, based on the distance between the position of the vehicle 1 and the parking area, whether the parking travel control is executable by the travel controller 7, and whether a driver is in the vehicle 1. The travel controller 7 and the notification device 8 may be implemented in the same ECU.

Figure 3:
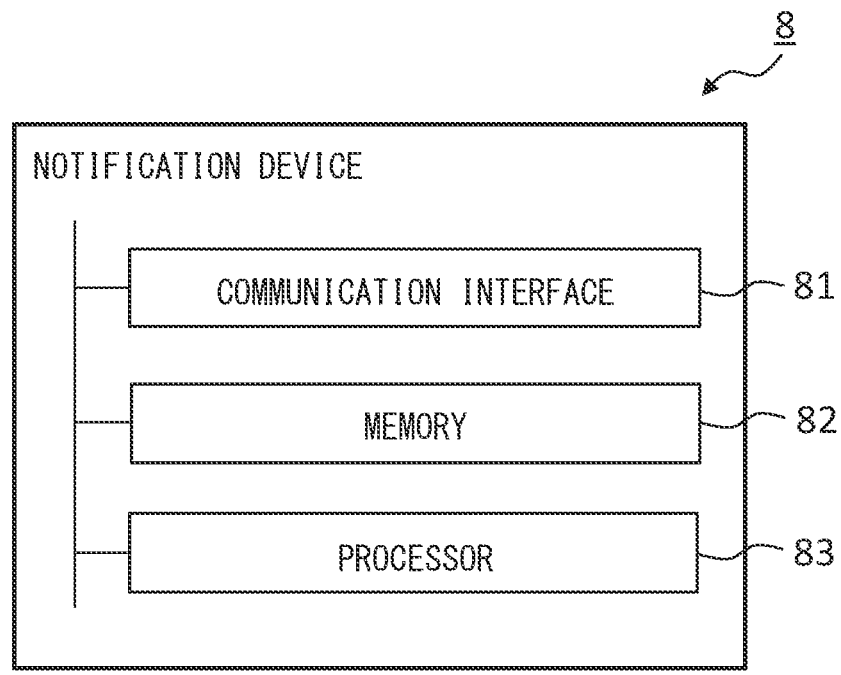
FIG. 3 schematically illustrates the hardware of the notification device.

FIG. 3 schematically illustrates the hardware of the notification device 8.

The communication interface 81, which is an example of a communication unit, includes a communication interface circuit for connecting the notification device 8 to the in-vehicle network. The communication interface 81 provides received data for the processor 83, and outputs data provided from the processor 83 to an external device.

The memory 82 includes volatile and nonvolatile semiconductor memories. The memory 82 stores various types of data used for processing by the processor 83, such as predetermined-distance information indicating a predetermined distance for determining whether the position of the vehicle 1 is near a predetermined parking area and a parking travel-disabled image indicating that the parking travel control is not executable. The memory 82 also stores various application programs, such as a notification program for executing a notification process.

The processor 83, which is an example of a control unit, includes one or more processors and a peripheral circuit thereof. The processor 83 may further include another operating circuit, such as a logic-arithmetic unit, an arithmetic unit, or a graphics processing unit.

Figure 4:
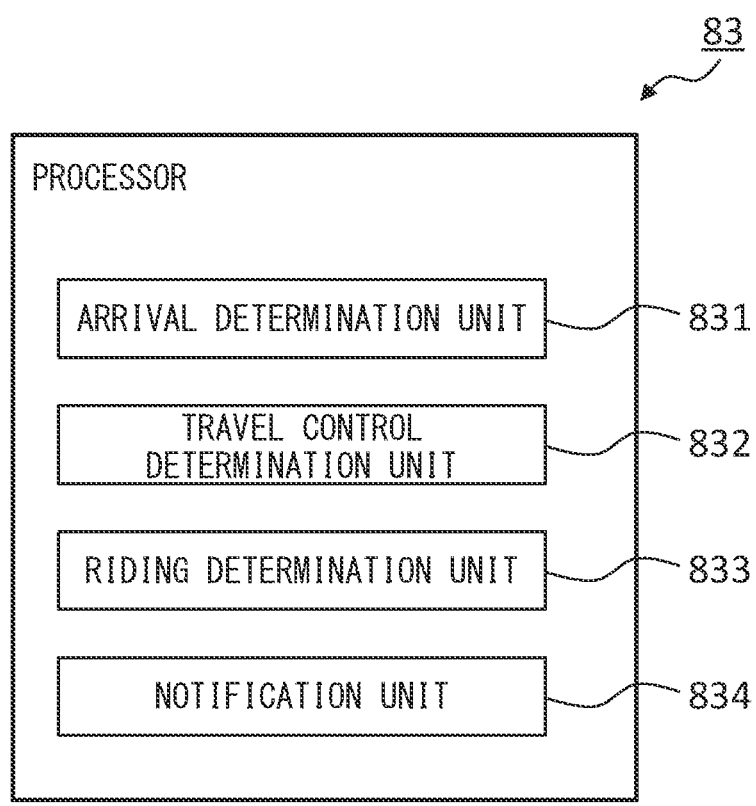
FIG. 4 is a functional block diagram of a processor included in the notification device.

FIG. 4 is a functional block diagram of the processor 83 included in the notification device 8.

As its functional blocks, the processor 83 of the notification device 8 includes an arrival determination unit 831, a travel control determination unit 832, a riding determination unit 833, and a notification unit 834. These units included in the processor 83 are functional modules implemented by a computer program executed by the processor 83. The computer program for achieving the functions of the units of the processor 83 may be provided in a form recorded on a computer-readable portable storage medium, such as a semiconductor memory, a magnetic medium, or an optical medium. Alternatively, the units included in the processor 83 may be implemented in the notification device 8 as separate integrated circuits, microprocessors, or firmware.

The arrival determination unit 831 determines whether the vehicle 1 has arrived within a predetermined distance of a parking area.

For example, the arrival determination unit 831 identifies the position of the parking area PA, based on map information stored in the storage device 6, and identifies the position of the vehicle 1, based on a positioning signal outputted from the GNSS receiver 4. The arrival determination unit 831 then determines whether the interval between the positions of the parking area PA and the vehicle 1 is less than a predetermined distance stored in the memory 82.

When the interval between the vehicle 1 and the parking area falls below the predetermined distance, the arrival determination unit 831 determines that the vehicle 1 has arrived within the predetermined distance of the parking area PA.

The arrival determination unit 831 may determine whether the vehicle 1 has arrived within the predetermined distance of a parking area where the vehicle 1 is to be parked among a plurality of parking areas PA. This operation of the arrival determination unit 831 enables the notification device 8 to prevent unnecessary notification at arrival in the neighborhood of a parking area PA where the vehicle is not to be parked.

The travel control determination unit 832 determines whether the travel controller 7 is capable of executing the parking travel control.

For example, from the data communication module 5, the travel control determination unit 832 obtains the amounts of resources of the communication network NW allocated to the data communication module 5 in communication with the control device 102 in a predetermined time (e.g., the latest 15 minutes). When a statistically representative value (e.g., an average) of the obtained amounts of resources in the predetermined time is less than a resource threshold stored in the memory 82, the travel control determination unit 832 determines that the travel controller 7 is incapable of executing the parking travel control.

Alternatively, the travel control determination unit 832, for example, obtains confidence scores corresponding to one or more objects detected by the travel controller 7 from environmental data in a predetermined time. When a statistically representative value of the obtained confidence scores in the predetermined time is less than a confidence score threshold stored in the memory, the environmental data representing the surroundings may not be appropriately generated, for example, because something adheres to the windshield in front of the environmental camera 2. Thus, when the statistically representative value of the obtained confidence scores in the predetermined time is less than the confidence score threshold, the travel control determination unit 832 determines that the travel controller 7 is incapable of executing the parking travel control.

Alternatively, the travel control determination unit 832, for example, obtains the result of a self-test as to whether the parking travel control can be appropriately executed, from the travel controller 7. When the result of a self-test of the travel controller 7 is a failure, the travel control determination unit 832 determines that the travel controller 7 is incapable of executing the parking travel control.

The riding determination unit 833 determines whether a driver is in the vehicle 1.

The riding determination unit 833 determines that a driver is in the vehicle 1, for example, when sitting of a driver is detected by a seat sensor (not illustrated) for detecting sitting of a driver on the driver's seat of the vehicle 1. Alternatively, the riding determination unit 833 may determine that a driver is in the vehicle 1, for example, when a driver's face is detected from a driver image representing a face region of a driver; the driver image is generated by a driver monitoring camera (not illustrated) mounted on the vehicle 1. As another alternative, the riding determination unit 833 may determine that a driver is in the vehicle 1, for example, when opening of the door of the driver's seat of the vehicle 1 has not been detected for a predetermined period (e.g., the latest five minutes) by a door sensor (not illustrated) for detecting opening and closing of the door.

The notification unit 834 notifies the driver of the vehicle 1 that the parking travel control is not executable, via the meter display 3, in the case where it is determined that the vehicle has arrived within the predetermined distance of the parking area, the travel controller is incapable of executing the parking travel control, and the driver is in the vehicle.

The notification unit 834 causes a parking travel-disabled image indicating that the parking travel control is not executable to appear on the meter display 3, thereby notifying the driver of the vehicle 1 that the parking travel control is not executable. The parking travel-disabled image may include a character string such as "Automated valet parking cannot be executed."

The notification unit 834 may output a voice saying that the parking travel control is not executable from a speaker device (not illustrated) that can output a voice, thereby notifying the driver of the vehicle 1 that the parking travel control is not executable.

The notification unit 834 may notify the driver that the parking travel control is not executable, via a portable device registered in the memory 52 in association with the driver, in the case where it is determined that the vehicle has arrived within the predetermined distance of the parking area, the travel controller is incapable of executing the parking travel control, and the driver is not in the vehicle. In this case, the driver will return to the vehicle 1 to handle the situation in which the parking travel control is not executable.

Figure 5:
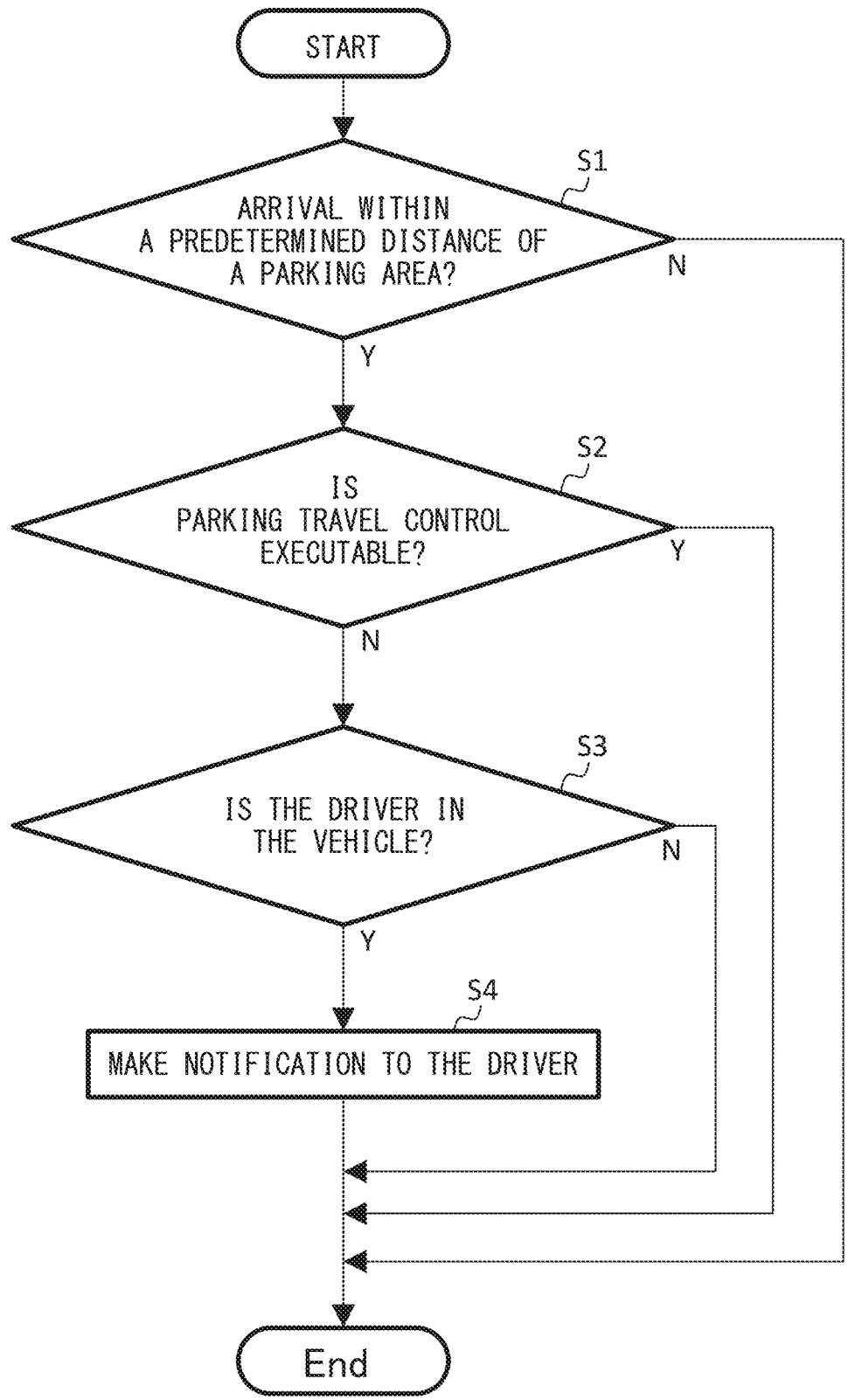
FIG. 5 is a flowchart of a notification process.

FIG. 5 is a flowchart of the notification process. During travel of the vehicle 1, the processor 83 of the notification device 8 executes the notification process described below at predetermined intervals (e.g., at intervals of one second).

First, the arrival determination unit 831 of the processor 83 of the notification device 8 determines whether the vehicle 1 has arrived within a predetermined distance of a parking area PA (step S1). When it is determined that the vehicle 1 has not arrived within a predetermined distance of a parking area PA (No in step S1), the arrival determination unit 831 terminates the notification process.

When it is determined that the vehicle 1 has arrived within a predetermined distance of a parking area PA (Yes in step S1), the travel control determination unit 832 determines whether the travel controller 7 is capable of executing the parking travel control (step S2). When it is determined that the travel controller 7 is capable of executing the parking travel control (Yes in step S2), the travel control determination unit 832 terminates the notification process.

When it is determined that the travel controller 7 is incapable of executing the parking travel control (No in step S2), the riding determination unit 833 of the processor 83 determines whether the driver of the vehicle 1 is in the vehicle 1 (step S3). When it is determined that the driver is not in the vehicle 1 (No in step S3), the riding determination unit 833 terminates the notification process.

When it is determined that the driver is in the vehicle 1 (Yes in step S3), the notification unit 834 notifies the driver of the vehicle that the parking travel control is not executable, via the meter display 3 (step S4) and terminates the notification process.

Execution of the notification process enables the notification device 8 to appropriately notify a driver of the state of a vehicle to be parked in a parking area designed for automated valet parking.

The determinations whether the vehicle 1 has arrived within a predetermined distance of a parking area PA (step S1), whether the travel controller 7 is capable of executing the parking travel control (step S2), and whether the driver of the vehicle 1 is in the vehicle 1 (step S3) may be executed in an order different from that illustrated in the flowchart. Alternatively, two or more of these determinations may be executed in parallel.

It should be noted that those skilled in the art can make various changes, substitutions, and modifications without departing from the spirit and scope of the present disclosure.

What is claimed is:

1. A notification device comprising a processor configured to:
   determine whether a vehicle has arrived within a predetermined distance of a parking area including a plurality of parking spaces and a control device that transmits control information to the vehicle via a communication network, wherein the vehicle is to be parked in one of the parking spaces, and the control information includes designation of a parking space assigned to the vehicle among the parking spaces and is used for parking travel control of the vehicle heading for the assigned parking space;
   obtain an amount of resources of a communication network allocated to a device for executing wireless communication between the vehicle and a computing device remote from the vehicle;
   determine whether a travel controller mounted on the vehicle is capable of executing the parking travel control based on whether the amount of resources is less than a predetermined threshold;
   determine whether a driver is in the vehicle; and
   notify a driver of the vehicle that the parking travel control is not executable, via an output device mounted on the vehicle, in the case where it is determined that the vehicle has arrived within the predetermined distance of the parking area, the travel controller is incapable of executing the parking travel control, and the driver is in the vehicle.

2. The notification device according to claim 1, wherein in the determination of arrival, the processor determines whether the vehicle has arrived within the predetermined distance of a parking area where the vehicle is to be parked among a plurality of parking areas each including a plurality of parking spaces and the control device.

3. A method for notification having a notification device that notifies information to a driver of a vehicle execute a process comprising:
   determining whether the vehicle has arrived within a predetermined distance of a parking area including a plurality of parking spaces and a control device that transmits control information to the vehicle via a communication network, wherein the vehicle is to be parked in one of the parking spaces, and the control information includes designation of a parking space assigned to the vehicle among the parking spaces and is used for parking travel control of the vehicle heading for the assigned parking space;
   obtaining an amount of resources of a communication network allocated to a device for executing wireless communication between the vehicle and a computing device remote from the vehicle;
   determining whether a travel controller mounted on the vehicle is capable of executing the parking travel control based on whether the amount of resources is less than a predetermined threshold;
   determining whether the driver is in the vehicle; and
   notifying the driver that the parking travel control is not executable, via an output device mounted on the vehicle, in the case where it is determined that the vehicle has arrived within the predetermined distance of the parking area, the travel controller is incapable of executing the parking travel control, and the driver is in the vehicle.

4. A non-transitory computer-readable medium storing a computer program for notification, the computer program causing a computer mounted on a vehicle to execute a process comprising:
   determining whether the vehicle has arrived within a predetermined distance of a parking area including a plurality of parking spaces and a control device that transmits control information to the vehicle via a communication network, wherein the vehicle is to be parked in one of the parking spaces, and the control information includes designation of a parking space assigned to the vehicle among the parking spaces and is used for parking travel control of the vehicle heading for the assigned parking space;
   obtaining an amount of resources of a communication network allocated to a device for executing wireless communication between the vehicle and a computing device remote from the vehicle;
   determining whether a travel controller mounted on the vehicle is capable of executing the parking travel control based on whether the amount of resources is less than a predetermined threshold;

determining whether a driver is in the vehicle; and notifying the driver that the parking travel control is not executable, via an output device mounted on the vehicle, in the case where it is determined that the vehicle has arrived within the predetermined distance of the parking area, the travel controller is incapable of executing the parking travel control, and the driver is in the vehicle.

\* \* \* \* \*